United States Patent
Clabunde

(10) Patent No.: US 9,512,908 B2
(45) Date of Patent: Dec. 6, 2016

(54) OSCILLATINGLY DRIVEN POWER TOOLS WITH TOOTHED BELT DRIVE

(71) Applicant: Joachim Clabunde, Heubach (DE)

(72) Inventor: Joachim Clabunde, Heubach (DE)

(73) Assignee: C. & E. Fein GmbH (DE)

(*) Notice: Subject to any disclaimer, the term of this patent is extended or adjusted under 35 U.S.C. 154(b) by 536 days.

(21) Appl. No.: 14/149,446

(22) Filed: Jan. 7, 2014

(65) Prior Publication Data

US 2014/0190285 A1 Jul. 10, 2014

(30) Foreign Application Priority Data

Jan. 7, 2013 (DE) .................. 10 2013 100 085

(51) Int. Cl.
| | | |
|---|---|---|
| *B24B 23/04* | (2006.01) | |
| *F16H 19/08* | (2006.01) | |
| *B24B 23/03* | (2006.01) | |
| *B25F 5/00* | (2006.01) | |
| *B24B 47/12* | (2006.01) | |

(52) U.S. Cl.
CPC ............. *F16H 19/08* (2013.01); *B24B 23/03* (2013.01); *B24B 23/04* (2013.01); *B24B 47/12* (2013.01); *B25F 5/00* (2013.01); *Y10T 74/18152* (2015.01)

(58) Field of Classification Search
CPC ..... B24B 23/00; B24B 23/028; B24B 23/03; B24B 23/04; B24B 23/005; B24B 41/04; B24B 41/042; B25F 5/00; B25F 5/001; B25F 5/006
USPC ...... 173/49, 109, 110, 216, 217, 122, 162.2; 451/344, 357, 359; 30/392
See application file for complete search history.

(56) References Cited

U.S. PATENT DOCUMENTS

| | | | | |
|---|---|---|---|---|
| 2,350,098 | A * | 5/1944 | Decker | B24B 23/04 451/163 |
| 3,172,241 | A * | 3/1965 | Habenicht | B24B 15/00 451/271 |
| 3,665,651 | A * | 5/1972 | Wylde | B24B 13/02 451/271 |
| 4,242,839 | A * | 1/1981 | Armbruster | B24B 23/04 451/357 |
| 4,989,488 | A | 2/1991 | Potzsch | |
| 5,425,666 | A * | 6/1995 | Frank | B24B 23/03 451/344 |
| 5,919,085 | A * | 7/1999 | Izumisawa | B24B 23/04 451/356 |
| 6,569,002 | B2 * | 5/2003 | Smith | B24B 23/04 451/349 |
| 6,726,553 | B2 * | 4/2004 | Tiede | B24B 23/03 451/344 |
| 6,890,247 | B2 | 5/2005 | Dehde | |
| 8,152,601 | B2 * | 4/2012 | Zaiser | B25F 5/001 451/357 |
| 8,397,832 | B2 | 3/2013 | Blickle et al. | |
| 8,881,409 | B2 * | 11/2014 | Haman | B27B 19/006 173/217 |

(Continued)

FOREIGN PATENT DOCUMENTS

| | | |
|---|---|---|
| CA | 2305964 A1 | 6/1990 |
| CA | 2004473 C | 7/2000 |
| DE | 3840974 A1 | 6/1990 |

(Continued)

*Primary Examiner* — Scott A. Smith
(74) *Attorney, Agent, or Firm* — St. Onge Steward Johnston & Reens, LLC

(57) ABSTRACT

The invention discloses an oscillatingly driven power tool, having a motor shaft that can be driven rotationally by a motor and that is coupled via a toothed-belt drive and an eccentric coupling drive to a tool spindle, for the purpose of driving the latter.

20 Claims, 2 Drawing Sheets

(56) References Cited

U.S. PATENT DOCUMENTS

| | | | |
|---|---|---|---|
| 9,085,058 B2* | 7/2015 | Clabunde | B23Q 11/0032 |
| 2002/0193055 A1* | 12/2002 | Tiede | B24B 23/03 |
| | | | 451/344 |
| 2007/0094877 A1* | 5/2007 | Bohne | B27B 19/006 |
| | | | 30/392 |
| 2012/0067607 A1 | 3/2012 | Weber et al. | |
| 2012/0080206 A1 | 4/2012 | Walker | |
| 2013/0153255 A1 | 6/2013 | Fuchs | |

FOREIGN PATENT DOCUMENTS

| | | |
|---|---|---|
| DE | 4342986 C1 | 12/1994 |
| DE | 9315019 U1 | 2/1995 |
| DE | 10134308 A1 | 1/2003 |
| DE | 202009011312 U1 | 12/2010 |
| DE | 102010039787 A1 | 3/2012 |
| DE | 102010046629 A1 | 3/2012 |
| DE | 102011015117 A1 | 9/2012 |
| EP | 0337303 A2 | 10/1989 |

* cited by examiner

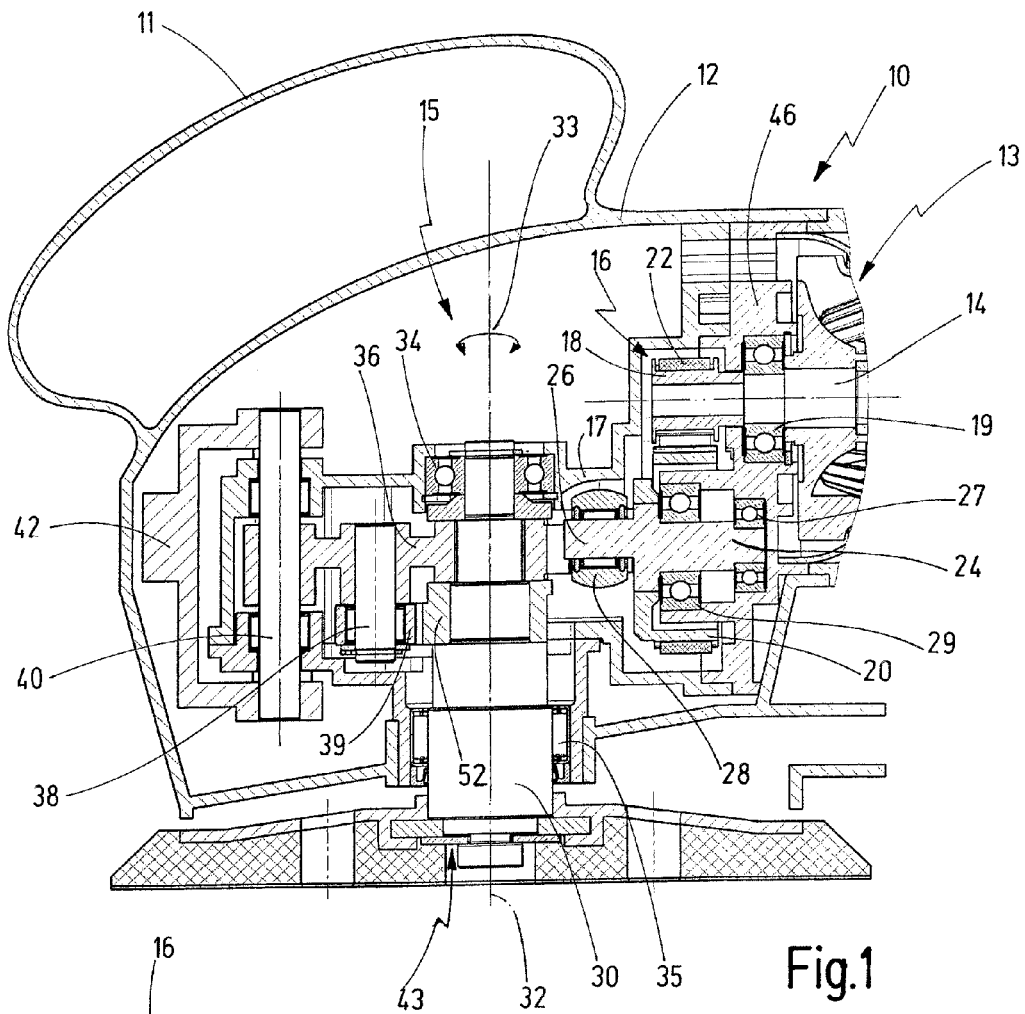
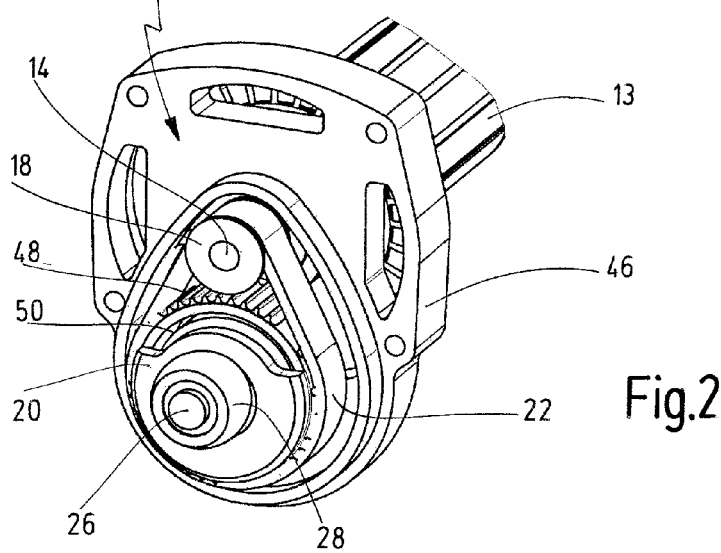

OSCILLATINGLY DRIVEN POWER TOOLS WITH TOOTHED BELT DRIVE

FIELD OF THE INVENTION

The invention relates to an oscillatingly driven power tool, having a motor shaft that can be driven rotationally by a motor and that can be coupled via a transmission and an eccentric coupling drive to a tool spindle, for the purpose of driving the latter.

BACKGROUND OF THE INVENTION

Such an oscillatingly driven power tool is known from DE 10 2010 046 629 A1. In that case, a motor, by means of its motor shaft, directly drives an eccentric coupling drive, which converts the rotating driving motions of the motor shaft into an oscillatory motion that is converted, by means of a planetary gearing, into an oscillatory output motion of a tool spindle having an opposite direction of rotation.

Such an arrangement enables a tool spindle to be driven in a rotationally oscillating manner about its longitudinal axis, the tool spindle being drivable at a frequency in the desired range of approximately 5000 to 30000 l/min and with a swivel angle in the range of approximately 0.5° to 7°, depending on the driving speed of the motor, the transmission ratio of the planetary gearing, and the eccentricity and lever arm of the eccentric coupling drive.

Moreover, owing to the motion reversal effected by the planetary gearing, the vibration associated with the transmission is kept to a very low level.

However, the relatively large amount of noise generated and the wear susceptibility of the transmission may be considered to be disadvantageous.

In some cases, as an alternative to the use of toothed gearings, belt drives have also become known in the prior art for driving a tool spindle in the case of hand-held tools.

Thus, for instance, DE 43 42 986 C2 discloses the driving of a random-orbit sander by means of a belt drive that, by means of deflection rollers, converts the rotary motion of the drive motor into a rotary motion of an output shaft that extends at an angle in relation to the motor shaft and drives a random-orbit disc.

The use of a belt drive in connection with a sanding appliance is also known from US 2012/0080206 A1. In that case, however, the belt drive is used only to drive a suction extraction device.

Common to the aforementioned belt drives, however, is that they are only ever used to transmit a rotary motion.

Additionally known, from EP 0 337 303 A2, is a drive device for a saw blade, in which a connecting rod, operated by an eccentric pin of a motor shaft, is used to drive in oscillation a rocker arm that is mounted on one side. Fastened to the free end of the rocker arm is a tensioned band, provided as a transmission means, which serves to drive a saw tool.

This is not a belt drive in the conventional sense, however, but merely a cable drive, which serves to transmit the driving motion of a rocker arm, driven in an oscillatory manner, directly to a saw blade fastened to the cable or band.

SUMMARY OF THE INVENTION

It is one object of the invention to disclose an oscillatingly driven power tool having low generated noise.

It is a further object of the invention to disclose an oscillatingly driven power tool having low wear.

It is a further object of the invention to disclose an oscillatingly driven power tool having low vibrations.

It is a further object of the invention to disclose an oscillatingly driven power tool of reliable design.

According to one aspect these and other objects are achieved in that a transmission configured as a toothed-belt drive is used for transmitting the motor shaft motion onto the eccentric drive for oscillatingly driving the tool spindle about a longitudinal axis thereof.

According to the invention, a toothed-belt drive is used, instead of a toothed gearing, to gear-up, preferably to gear-down, the driving motion of the motor. This has the advantage that generated noise and wear are significantly reduced in comparison with toothed gearings. A further advantage consists in that, unlike other belt drives such as, for instance, V-belt drives, a toothed-belt drive can easily be used inside the transmission housing without any need for sealing against oil, grease and the like. Other belt drives that operate by frictional transmission such as, for instance, V-belt drives, usually require dry operation, since it is only thus that a sufficient coefficient of friction can be ensured for transmission. This requires elaborate sealing measures, in order to keep the belt drive dry in every case. By contrast, a toothed-belt drive can be operated both dry and with lubrication.

A further advantage in the use of a toothed-belt drive consists in that the distance between the belt pulleys can be fixed, i.e. non-adjustable, since there is no need for tensioning of the belt. This facilitates assembly and ensures that there is no need to readjust the belt during operation.

According to a further aspect of the invention, the toothed-belt drive has a reduction ratio, preferably in the range from 1:2 to 1:5, more preferably in the range from 1:2.5 to 1:3.2.

This gives the advantage that the usual driving speed of a universal motor, having a motor speed of approximately 30000 l/min, can be used to effect an oscillation of the tool spindle in the range from approximately 7500 to 15000 l/min. This is the preferred driving speed for the tool spindle of a tool driven in an oscillatory manner that is used, in particular, for sanding, while the driving speed of a universal motor is typically in the range of about 30000 l/min.

According to a further aspect of the invention, the toothed-belt drive comprises a first belt wheel, which is driven by the motor, and a second belt wheel, which drives the eccentric coupling drive.

In this way, the toothed-belt drive is used such that it runs in one direction, this being advantageous in respect of wear.

According to a further aspect of the invention, the eccentric coupling drive has an eccentric pin, which is driven by the second belt wheel.

This makes it possible to achieve a particularly small structural size and a simple structure.

In this case, the eccentric pin, together with an eccentric bearing held thereon, is preferably accommodated on the second belt wheel, and the second belt wheel has a mass compensation in order to compensate the imbalance caused by the eccentric pin and the eccentric bearing.

This makes it possible to achieve a particularly compact structural size. At the same time, simple means can be used to compensate the imbalance caused by the eccentric pin and the eccentric bearing.

For this purpose, in a preferred development of the invention, the second belt wheel has an opening on the side on which the eccentric pin is disposed.

The imbalance can thus be compensated in a particularly simple manner.

In a further aspect of the invention, for the purpose of converting an oscillating driving motion, generated by the eccentric coupling drive, into an oscillating driving motion of the tool spindle, the eccentric coupling drive is realized with an opposite direction of rotation.

The overall level of generated vibration is reduced considerably as a result.

According to a further aspect of the invention, the eccentric coupling drive has an eccentric lever, which is pivotally mounted at a first end and, at a second end, is driven by the eccentric pin.

The tool spindle in this case is preferably driven by means of an oscillating lever, which acts on the eccentric lever in a rotationally movable manner.

In this way, the oscillating motion of the eccentric lever is easily converted into an oscillating driving motion of the tool spindle, having an opposite direction of rotation.

According to a further aspect of the invention, the eccentric coupling drive has a counterweight, which is driven by the eccentric lever.

Preferably, in this case, the counterweight is accommodated at the outer end of the eccentric lever.

Moreover, the counterweight in this case can be disposed outside of the transmission housing, such that the transmission housing can be very compact in form. The lubricant space can thus be kept very small, such that the grease requirement can be reduced to a minimum. Moreover, power losses of the machine resulting from flexing work, caused by grease moved back and forth, can be reduced considerably.

Overall, this results in operation with very little vibration, combined with only little heating and high efficiency of the machine.

It is understood that the above-mentioned features of the invention and those yet to be explained in the following can be applied, not only in the respectively specified combination, but also in other combinations or singly, without departure from the scope of the invention.

BRIEF DESCRIPTION OF THE DRAWINGS

Further features and advantages of the invention are given by the following description of a preferred exemplary embodiment, with reference to the drawings, wherein:

FIG. 1 shows a partial section through a power tool according to the invention, in the region of the transmission housing;

FIG. 2 shows an enlarged representation of the toothed-belt drive according to the invention, in a perspective view, with a bearing block, on which the motor and the toothed-belt drive are carried.

DETAILED DESCRIPTION OF THE INVENTION

Figure 3:
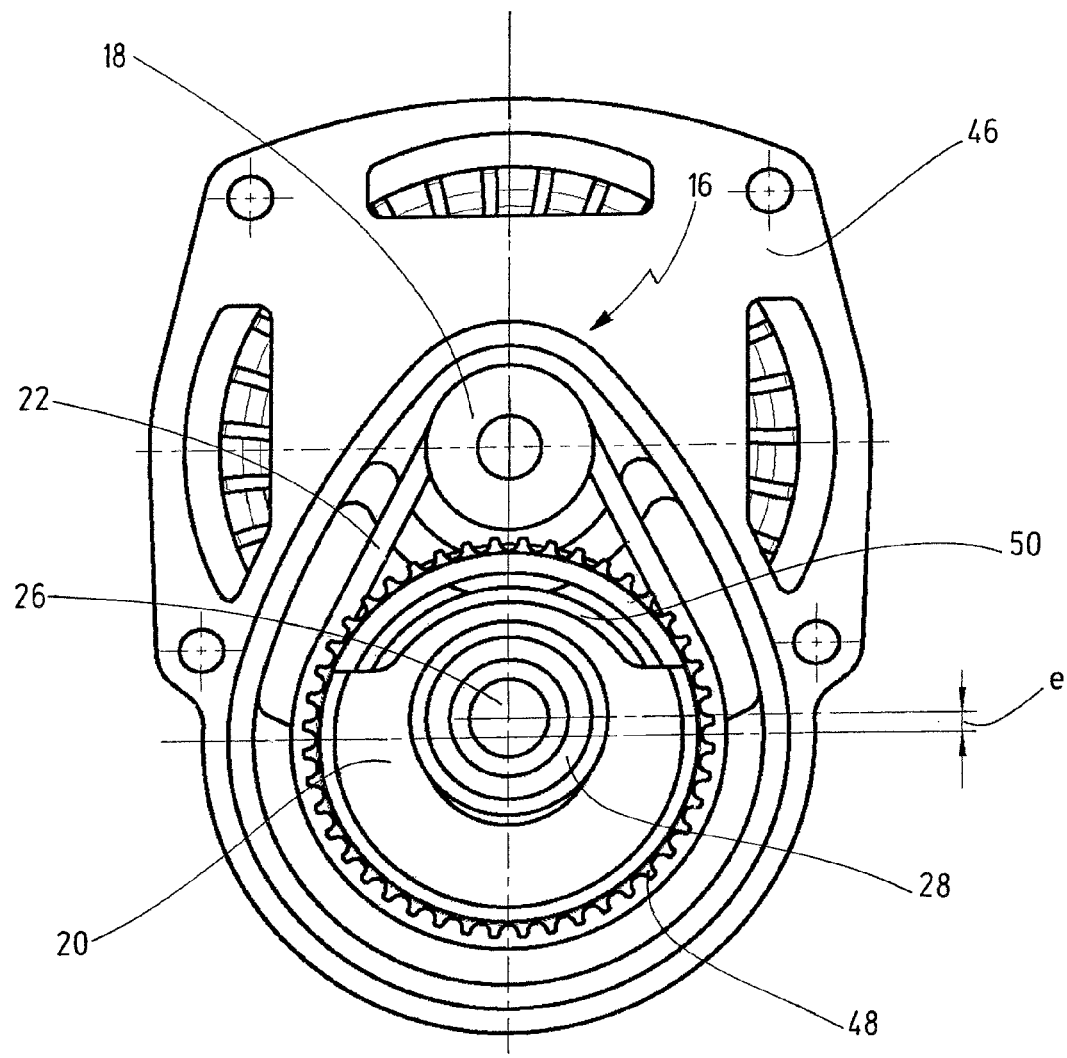
FIG. 3 shows an enlarged view of the toothed-belt drive according to FIG. 2, from the front.

Represented in FIG. 1 and denoted as a whole by the numeral 10 is a power tool according to the invention, in the form of a hand-held sanding appliance, in the region of its transmission head.

The power tool 10 has a machine housing 12, within which there is provided a transmission housing 17, in which there is mounted a tool spindle 30 that, with one of its ends, projects outwards, out of the transmission housing 17 and the machine housing 12.

The tool spindle 30 is mounted by means of two bearings 34, 35 and, at its outer end, has a receiver 43, to which a tool 44, in this case an abrasive tool, is detachably fastened.

Indicated at the upper end of the machine housing 12, on a side that faces away from the tool 44, there is a handle 11, by which the power tool 10 can be held during a working operation.

Accommodated inside the transmission housing 17 is an eccentric coupling drive, denoted as a whole by 15, which converts the rotating driving motion of a motor 13 into a rotationally oscillating driving motion of the tool spindle 30 about its longitudinal axis 32, as indicated by a double arrow 33.

The eccentric coupling drive 15 causes the tool spindle 30 to execute an oscillating driving motion at a frequency of between approximately 5000 and 15000 l/min and with a swivel angle in the range of approximately 0.5° to 7°.

The rotating driving motion of the motor shaft 14 of the motor 13 is first geared-down, via a toothed-belt drive 16, into a driving motion of an eccentric shaft 24. Seated on the eccentric shaft 24 is an eccentric pin 26, on which a domed eccentric bearing 28 is held.

FIGS. 2 and 3 show the toothed-belt drive 16, which is accommodated on a bearing block 46. The motor shaft 14 is also mounted on the bearing block 46, by means of a motor bearing 19. In addition, the eccentric shaft 24, with the eccentric pin 26 and the eccentric bearing 28, is mounted on the bearing block 46 by means of two bearings 27, 29.

The toothed-belt drive 16 has a first belt wheel 18, which is accommodated directly at the end of the motor shaft 14. The toothed-belt drive 16 additionally has a second belt wheel 20, which is accommodated on the eccentric shaft 24. A toothed belt 22 is driven by the first belt wheel 18 and drives the second belt wheel 20, via the toothing 48 of the latter, as a result of which the eccentric pin 26, with the eccentric bearing 28 held thereon, is made to execute an eccentric motion.

The motor 13 is preferably a universal motor having, for example, a motor speed of 30250 l/min (if appropriate, 27500 l/min).

The toothed-belt drive has, for example, a belt reduction ratio of 1:2.75, resulting in an oscillation frequency of 11000 l/min (10000 l/min in the case of a motor speed of 275000 l/min) for the tool spindle 30 and the abrasive tool 44 held thereon.

The eccentric radius is, for example, 3.56 mm (cf. FIG. 3, eccentricity e), resulting in an eccentric stroke of 7.12 mm. This eccentric stroke is converted, via the eccentric coupling drive 15, into a swivel angle of ±3° (6° absolute) of the tool spindle 30.

As shown by FIGS. 2 and 3, the second belt wheel 20 has an opening 50, on the same side as the eccentric pin 26, to compensate the imbalance caused by the offset of the eccentric pin 26 by the eccentricity e.

The motion of the eccentric pin 26, or of the eccentric bearing 28, is converted into an oscillating motion of an eccentric lever 36 that, with one of its ends, encompasses the eccentric bearing 28 from the outside and, at its opposite end, is pivotally mounted on an eccentric lever axle 40.

Accommodated on the eccentric lever 36 is a pivot bearing, consisting of a bearing axle 38 and a bearing 39, which drives an oscillating lever 52, which is connected to the tool spindle 30 in a rotationally fixed manner.

In this way, the oscillating driving motion of the eccentric lever 36 is converted, by means of a motion reversal device consisting of the bearing axle 38, the bearing 39 and the oscillating lever 52, into an oscillating driving motion of the tool spindle 30, having a direction of rotation opposite to that of the driving motion of the eccentric lever 36. This reversal of the direction of rotation results in a perceptible reduction in the vibration emitted by the eccentric coupling drive 15 (of which details are given in EP 11 176 980.8, which is included here in its entirety by reference).

The eccentric coupling drive 15, which converts the motion of the eccentric pin 26 into the oscillating driving motion of the tool spindle 30, and which in this case converts the driving motion of the eccentric lever 36 into the driving motion of the oscillating lever 52 having a reversed direction of rotation, which ultimately drives the tool spindle 30, is accommodated inside the transmission housing 17.

Accommodated on the eccentric lever axle 40, outside the transmission housing 17 but inside the machine housing 12, there is a counterweight 42, which compensates the imbalance caused by the eccentric lever 36 and the oscillating lever 52.

The selected reduction ratio of the toothed-belt drive 16 and the design of the eccentric coupling drive 15 result in a nominal oscillation frequency of 11000 1/min of the tool spindle 30 and in a swivel angle of ±3° (6° absolute) at the tool spindle 30. This is optimal for an abrasive tool 44 of a diameter up to approximately 150 mm.

A higher frequency and a yet greater swivel angle would result in greater noise generation and increased wear.

In comparison with a conventional design having a toothed gearing, the use of the toothed-belt drive 16 results in significantly quieter operation and less wear. Advantageously in this case, the toothed-belt drive 16 can be accommodated in the grease-filled or oil-filled space in the transmission housing 17, without the need for sealing measures. On the contrary, the lubricants accommodated inside the transmission housing 17 have a positive effect upon the toothed belt drive 16, and increase its service life.

What is claimed is:

1. An oscillatingly driven power tool, comprising:
   a motor having a motor shaft driven rotatingly by said motor;
   a tool spindle;
   a transmission being configured as a toothed-belt drive;
   an eccentric coupling drive comprising an eccentric pin and an eccentric lever for driving said tool spindle, said toothed-belt comprising a toothed-belt being driven by said motor spindle and driving said eccentric pin; and
   an eccentric lever mounted pivotably at a first end thereof, being driven by said eccentric pin at a second end thereof, said eccentric lever driving said tool spindle about a longitudinal axis thereof oscillatingly in a first alternating direction opposite to a second alternation direction in which said eccentric lever is driven.

2. The power tool of claim 1, wherein said toothed-belt drive is lubricated.

3. The power tool of claim 1, wherein said toothed-belt drive has a reduction ratio in the range from 1:2 to 1:5.

4. The power tool of claim 1, wherein said toothed-belt drive has a reduction ratio in the range from 1:2.5 to 1:3.2.

5. An oscillatingly driven power tool, comprising:
   a motor having a motor shaft rotatingly driven by said motor;
   a tool spindle;
   an eccentric coupling drive comprising an eccentric pin supported on an eccentric shaft and an eccentric lever for driving said tool spindle oscillatingly about a longitudinal axis thereof;
   a transmission being configured as a toothed-belt drive comprising a toothed-belt engaging a first belt wheel being driven by said motor shaft and a second belt wheel driving said eccentric shaft;
   wherein said eccentric pin, together with an eccentric bearing held thereon, are supported on said eccentric shaft; and
   wherein said second belt wheel comprises a mass compensation for compensating any imbalance caused by said eccentric pin and said eccentric bearing.

6. The power tool of claim 5, wherein said second belt wheel, for effecting said mass compensation, comprises a cutout on a side on which said eccentric pin is disposed.

7. The power tool of claim 5, wherein said toothed-belt drive is lubricated.

8. The power tool of claim 5, wherein said toothed-belt drive has a reduction ratio in the range from 1:2 to 1:5.

9. The power tool of claim 5, wherein said toothed-belt drive has a reduction ratio in the range from 1:2.5 to 1:3.2.

10. The power tool of claim 5, wherein said eccentric lever further comprises a first end engaging said eccentric bearing and a second end being pivotable about an eccentric lever shaft.

11. The power tool of claim 10, further comprising an oscillating lever having a first end and a second end, said first end of said oscillating lever engaging said eccentric lever shaft rotatably, said second end of said oscillating lever being fixed to said tool spindle for driving said tool spindle oscillatingly.

12. The power tool of claim 11, further comprising a bearing axis about which said oscillating lever is supported pivotably.

13. The power tool of claim 12, wherein said bearing axis is arranged between said tool spindle and said eccentric lever axis.

14. The power tool of claim 10, wherein said eccentric coupling drive further comprises a counterweight being driven by said eccentric lever.

15. The power tool of claim 14, wherein said counterweight is arranged at said first end of said eccentric lever.

16. The power tool of claim 14, further comprising a transmission housing, wherein said transmission and said eccentric coupling drive extend, and a machine housing enclosing said transmission housing, wherein said counterweight is arranged outside of said transmission housing but inside of said machine housing.

17. An oscillatingly driven power tool, comprising:
   a motor having a motor shaft driven rotatingly by said motor;
   a tool spindle;
   a transmission being configured as a toothed-belt drive; and
   an eccentric coupling drive being driven by said motor shaft and driving said tool spindle oscillatingly about a longitudinal axis thereof.

18. The power tool of claim 17, wherein said toothed-belt drive comprises a toothed-belt engaging a first belt wheel being driven by said motor shaft, and further engaging a second belt wheel driving said eccentric coupling drive.

19. The power tool of claim 18, wherein said eccentric coupling drive comprises an eccentric pin being driven by said second belt wheel, and an eccentric bearing arranged on said eccentric pin, said eccentric bearing being engaged by an eccentric lever oscillatingly driving said tool spindle.

20. The power tool of claim 19, further comprising an eccentric shaft whereon said eccentric pin, together with said eccentric bearing held thereon, and said second belt wheel are arranged, said second belt wheel further comprising a mass compensation compensating any imbalance caused by said eccentric pin and said eccentric bearing.

* * * * *